INVENTOR
PETER CLIVE THONEMANN

BY Larson and Taylor

ATTORNEYS

Nov. 5, 1963 P. C. THONEMANN 3,109,801
GAS DISCHARGE APPARATUS

Filed June 20, 1958 10 Sheets-Sheet 5

INVENTOR
PETER CLIVE THONEMANN
BY Lawson and Taylor
ATTORNEYS

Nov. 5, 1963  P. C. THONEMANN  3,109,801
GAS DISCHARGE APPARATUS
Filed June 20, 1958  10 Sheets-Sheet 10

INVENTOR
PETER CLIVE THONEMANN

BY *Lousay and Taylor*

ATTORNEYS

United States Patent Office 3,109,801
Patented Nov. 5, 1963

3,109,801
GAS DISCHARGE APPARATUS
Peter Clive Thonemann, Cumnor, near Oxford, England, assignor to the United Kingdom Atomic Energy Authority, London, England
Filed June 20, 1958, Ser. No. 743,273
Claims priority, application Great Britain June 20, 1957
2 Claims. (Cl. 204—193.2)

This invention relates to gas discharge apparatus of the type in which a high-current ring discharge is produced in a gas contained in a torus. An apparatus of this type for use in research into the production of controlled thermonuclear reactors, is described in the specification of co-pending application Serial No. 692,500, filed October 25, 1957, now Patent 3,054,742, dated September 18, 1962.

In the apparatus described in the above-mentioned specification the ring discharge forms the single-turn is provided with two circumferential insulating gaps secondary winding of a pulse transformer and the torus or joints which, inter alia, prevent the torus itself acting as a short-circuited turn. Within the torus is arranged a liner system consisting of mutually insulated overlapping cylindrical metal segments whose function is to shield the gaps from the discharge and thus prevent their breaking down as a result of bombardment by ions and/or photons from the discharge.

It is an object of the present invention to provide an alternative form of liner system.

According to the present invention, in a gas discharge apparatus comprising a torus within which a gaseous ring discharge is set up and having a liner between the discharge and the wall of the torus, said liner is electrically continuous around its large circumference and has a resistance around said circumference which is large compared with the resistance of the discharge.

The material of the liner may be corrugated, said corrugations serving to increase the effective length of the large circumference of the liner. The material may be stainless steel.

An embodiment of the invention will now be described by way of example with reference to the accompanying drawings wherein.

Figure 1:
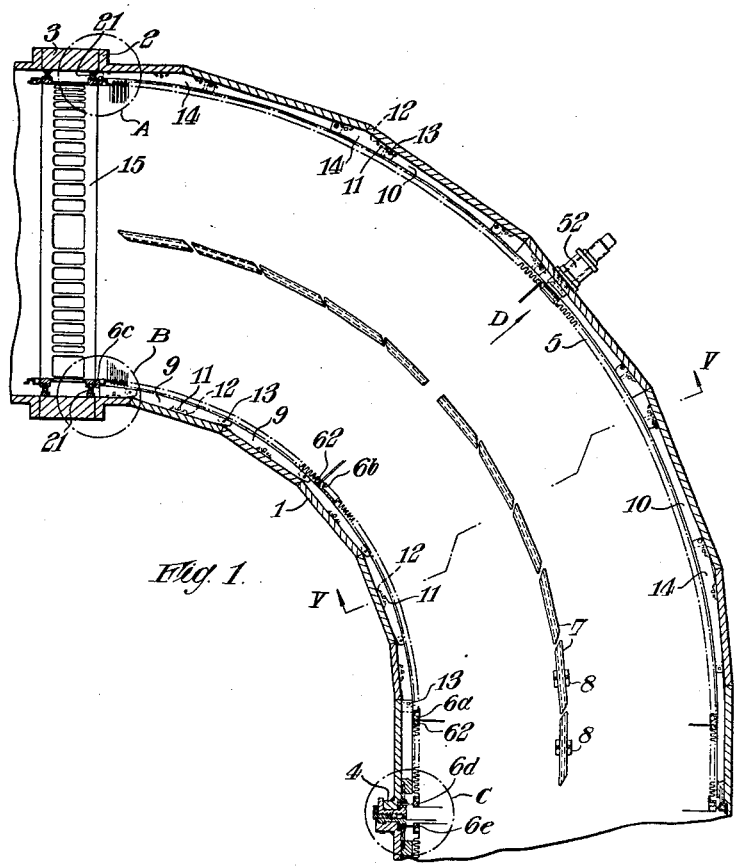
FIG. 1 is a cross-sectional plan view of one quadrant of the torus and liner arrangement of a gas discharge apparatus similar to that described in the specification of copending application Serial No. 692,500, filed October 25, 1957.
Figure 5:
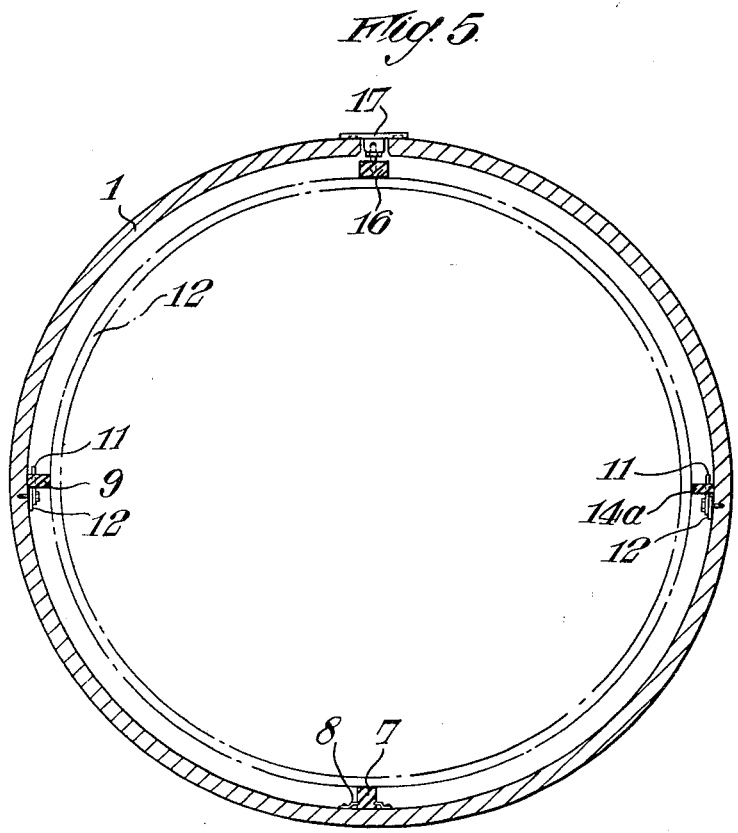
FIG. 5 is a section on the line V—V of FIG. 1.

Referring firstly to FIGS. 1 and 5, there is shown a torus quadrant 1 fabricated from short lengths of 1 inch inch thick aluminium tube. At one end of the torus quadrant is a flange 2 for securing the torus to a window box 3; at the other end is a flange 4 forming part of one of the two insulating joints or gaps between the two halves of the torus. In the present embodiment the window box 3 is a rectangular aluminium block having a central hole of the same diameter as the torus bore. Passages (not shown) in the lower face of the box form vacuum ports in the manner described in the aforementioned specification.

Within the torus 1 is a cylindrical liner 5 made of corrugated stainless steel. In each quadrant the liner is made in three sections connected together by pairs of flanges 62 and 6a and 6b welded to the ends of the sections. Flanges 62 carry studs and flanges 6a and 6b have corresponding holes as described hereinafter. Two of these sections are longer than the third and are each formed of four short cylindrical lengths welded together; the third section is a single length. The material used is 18/8 stainless steel, approximately 20 thou. thick, with a convolution depth of ¾ inch and 2½ convolutions per inch.

The liner 5 is located in the torus by Mycalex insulators as hereinafter described. The liner weight is carried by a row of Mycalex blocks 7 which are fastened to the bottom inner face of the torus by brackets 8 which engage slots in the sides of the blocks. Lateral positioning of the liner 5 is effected by an inner row of blocks 9 and an outer row 10 and 14 on the equator of the torus. The faces of these blocks are contoured to match the torus wall and the liner surface as shown. The inner blocks 9 are mounted on pins 11 which engage holes midway along each block, the pins being welded to plates 12 bolted to the wall of the torus. The blocks are linked together by tongue-and-slot joints, fastened by Mycalex pins 13.

In the outer row alternate blocks 14 are each mounted on two pins 11 and plates 12, the intermediate blocks 10 being fastened to the blocks 14 by tongue-and-slot joints and Mycalex pins 13.

An upper row of blocks 16 is fastened to bungs 17 which pass through holes in the upper wall of the torus. The blocks 16 are normally not in contact with the liner.

Where the liner passes through the window box 3 the corrugations are discontinued and a short colander section 15 is inserted in the liner. The wall of section 15 is slotted as shown to enable the liner to be evacuated through the ports in the lower face of the window box.

Figure 2:
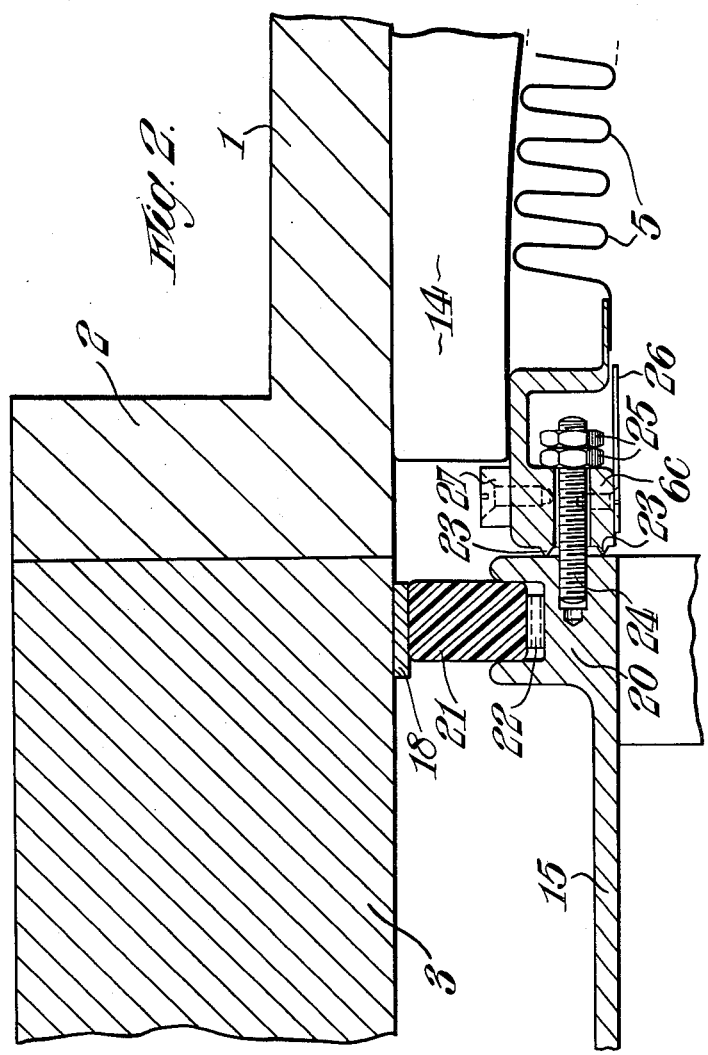
FIGS. 2, 3 and 4 are enlarged views of sections A, B and C respectively of FIG. 1.
Figure 3:
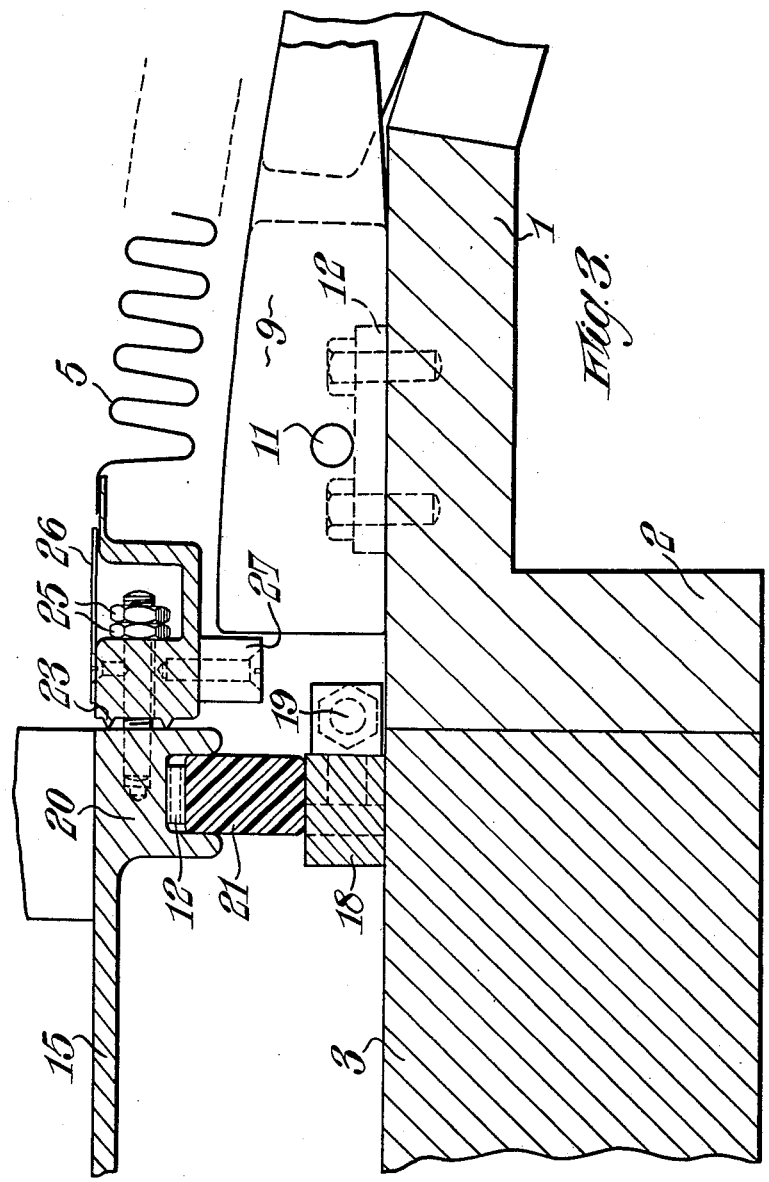

To enable the annular space between the liner and the wall to be evacuated to a lower pressure than the space within the liner, a partial vacuum seal is made between the two spaces at the window boxes, and FIGS. 2 and 3 illustrate how this sealing is effected. At each end of the window box a split eccentric steel ring 18 is expanded at the split against the bore of the box by a turnbuckle 19. At each end of the colander section 15 is a flange 20 having an annular recess within which is located a Mycalex insulating ring 21 spring-loaded aginst ring 18 by a corrugated leaf spring 22 made of Inconel. The ring insulator 21 is formed of a plurality of overlapping segments. Ring 18 is eccentric because, for maximum liner diameter, the continuous axis of the liner lies slightly outside the continuous axis of a torus constructed of straight sections in the present manner.

A flange 6c of the liner 5 adjacent the colander section is fastened to the flange 20 by studs 24 and nuts 25 as shown. The face of the flange 6c is provided with two concentric ridges 23 which press into the face of flange 20 and ensure good electrical contact. The nuts 25 and studs 24 are shielded from the discharge within the liner by their location in a recess in flange 6c which is closed by a stainless steel cover ring 26 screwed to the flange 6c. The same type of joint is made betwen the flanges 6a and 6b and 62 joining the corrugated liner sections in each quadrant, flanges 6a and 6b being similar to flange 6c and the flanges 62 being similar to flange 20 less the annular recess.

The insulators 21 are free to slide axially on ring 18, but movement of the liner as a whole is restrained by locating plates 27 screwed to flange 6a which abut on the ends of insulating blocks 14 and 9.

Figure 4:
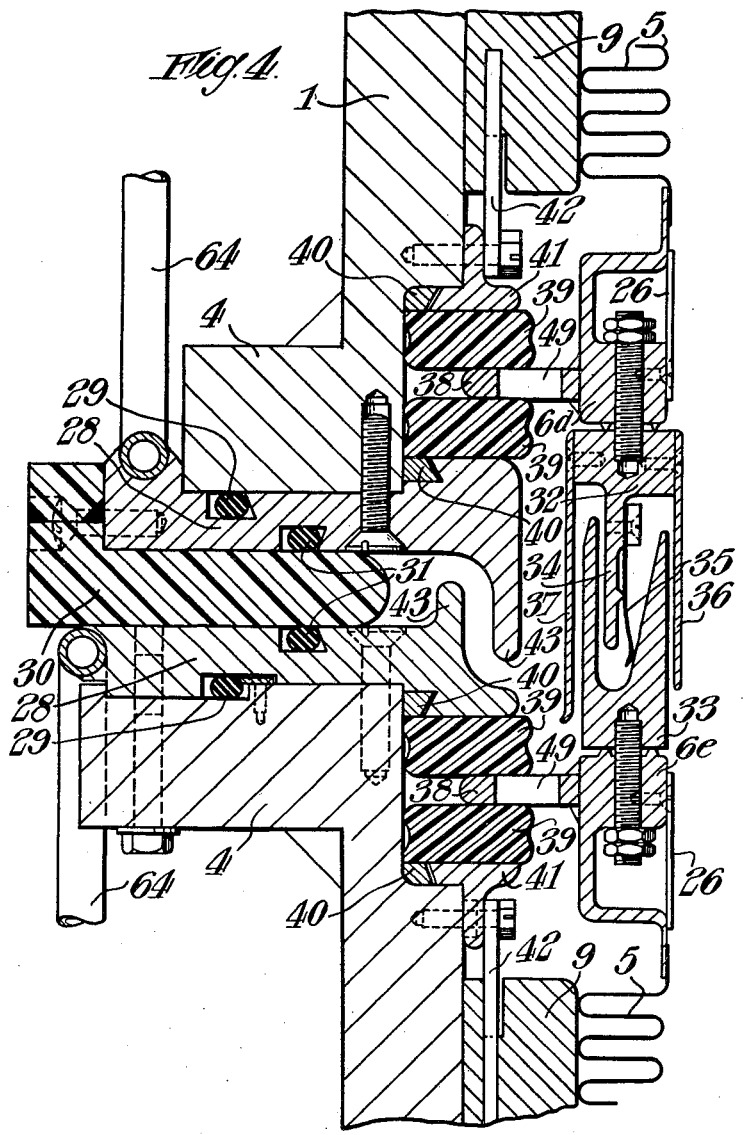

The liner joint at the other end of the quadrant is shown in FIG. 4, which also shows one of the two insulating joints or gaps around the circumference of the bore of the torus between the two halves thereof. Considering the torus joint first, each flange 4 has screwed to it an aluminium cheek 28, a seal being formed between flange and cheek by an O-ring seal 29. Secured to one of the cheeks is a polythene insulating ring 30. O-ring seals 31 are provided between each cheek 28 and the ring 30. No mechanical means is provided to clamp the two halves of the torus together, atmospheric pressure being adequate for this purpose when the torus is evacuated.

The two halves of the corrugated liner are connected together by a plug-and-socket assembly comprising a plug ring 32 and a socket ring 33 bolted to end flanges 6d and 6e respectively of the two half liners. Flanges 6d and 6e are again similar to flange 6c. A projecting lip 34 on the plug ring 32 carries a plurality of molybdenum spring contact fingers 35 which bear on the inside surface of the socket ring 33. An inner cover ring 36 serves the dual purpose of shielding the contact fingers from the discharge and providing a labyrinth path to reduce gas leakage from the liner into the space betwen liner and torus. An outer cover ring 37 increases the labyrinth effect.

The plug and socket rings 32 and 33 are restrained with respect to the torus by means of stainless steel rings 38 welded to the outer faces of the flanges 6d and 6e. Each of these rings 38 fit loosely between two segmented Mycalex ring insulators 39, each similar in construction to the insulators 21. Each insulator 39 is pinned to an undercut aluminium ring 40 which is held in place either by a cheek 28 or by a retaining ring 41. Brackets 42 mounted on rings 41 support the ends of the insulators 9. Thus the two halves of the torus/liner assembly can be separated simply by pulling them apart. Each ring 38 is perforated with a plurality of holes 49 to ensure evacuation of the annular space between the two rings.

In the aforementioned specification the liner system described was itself water-cooled by means of pipes welded to individual liner segments. The present liner is not water-cooled, and loses its heat only by radiation from its outer surface. To enhance the thermal emissivity of the outer surface, it is oxidised by baking in steam at 6–700° C. The inside surface is left bright. As a result of this radiation from the liner, the torus itself becomes heated and has to be cooled. In FIG. 4, for example, the cheeks 28 have welded onto them pipes 64, through which cooling water is circulated. Also, to shield the polythene insulator 30 from the hot liner, the inner edges of the cheeks are provided with lips 43.

Figure 8:
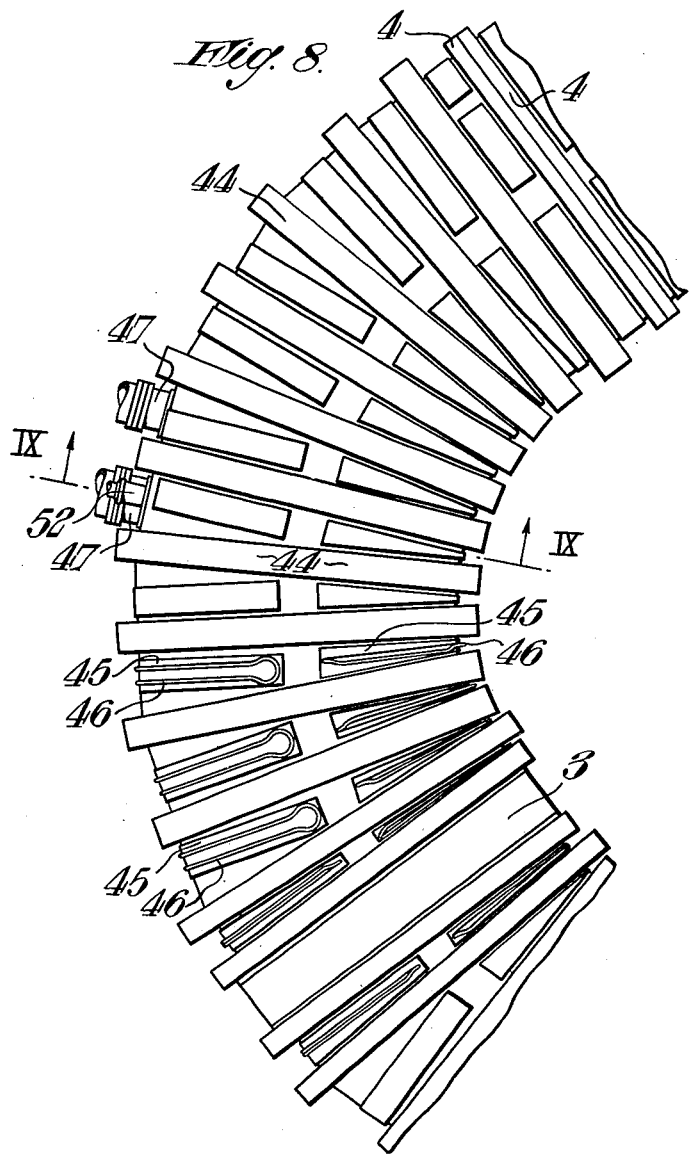
FIG. 8 is a plan view of a quadrant showing the positions of the cooling plates.
Figure 9:
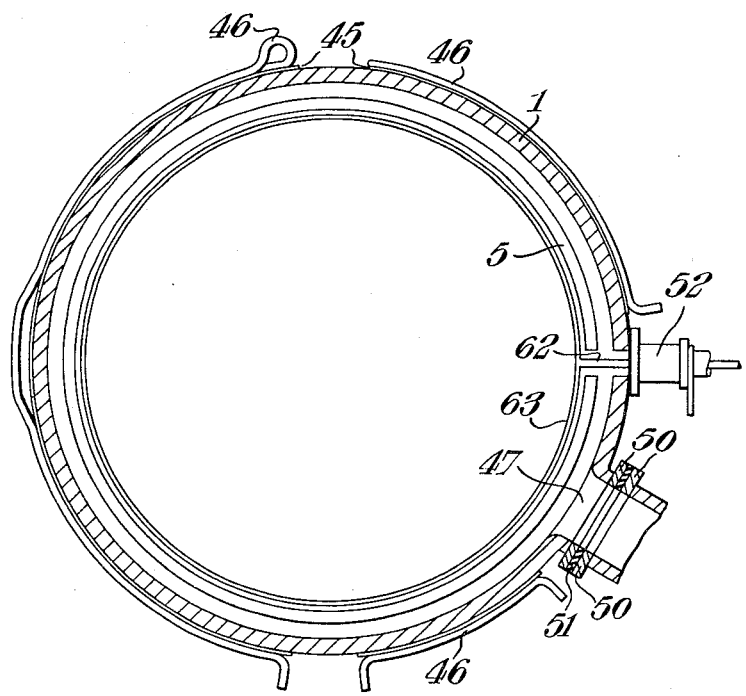
FIG. 9 is a section on the line IX—IX of FIG. 8.

The cooling arrangements for the remainder of the torus are shown in FIGS. 8 and 9. As described in the aforementioned specification, the torus is provided with a plurality of formers 44 for windings which produce an axial magnetic field for stabilising the discharge. Between these formers aluminium plates 45 are screwed or rivetted to the surface of the torus, these plates having welded to them aluminium pipes 46 which carry cooling water. The plates are shaped to fit between the formers and are interrupted where necessary to clear other connections such as ports 47 and 52, as shown in FIG. 9. Rubber tubing is used to interconnect the lengths of cooling pipe and form a series-parallel cooling circuit.

FIGS. 8 and 9 also show two ports 47 through which the annular space between torus and liner is evacuated, vacuum connections to these ports being made by means of flanges 50 and gaskets 51.

Figure 7:
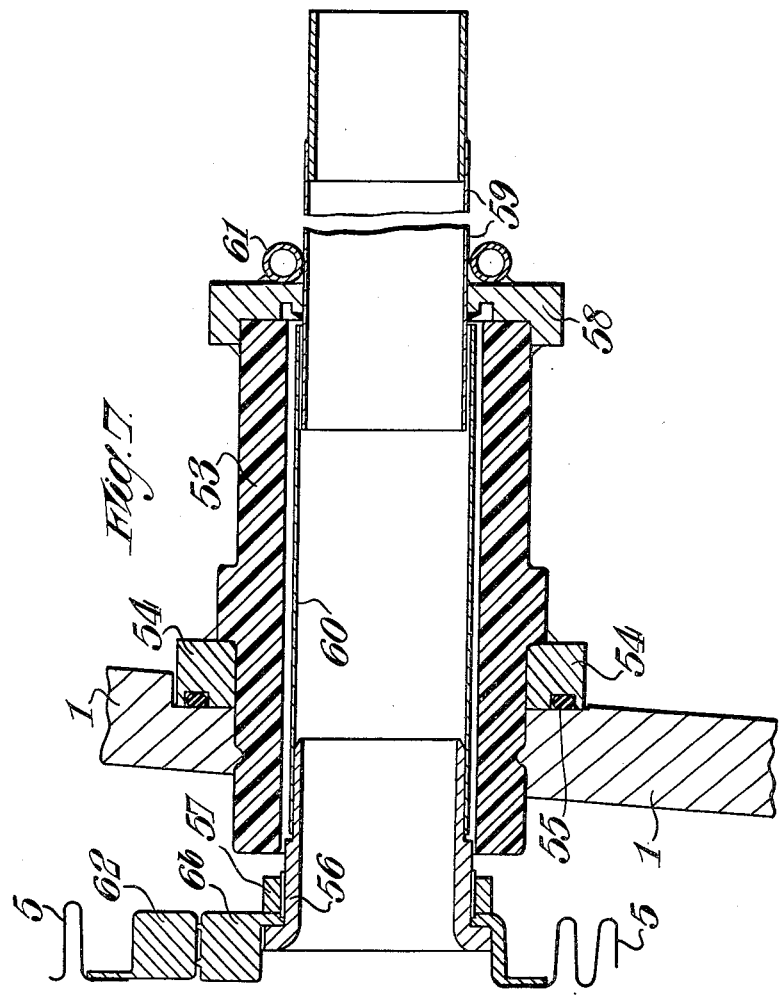
FIG. 7 is a longitudinal section of a probe port.

Access to the inside of the liner for experimental purposes and for ionising the gas therein prior to initiating each discharge, is by means of ports 52 provided halfway round each quadrant on the equator of the torus. One of these ports is shown in detail in FIG. 7. A tubular ceramic insulator 53 is sealed to a plate 54 which is bolted to the torus wall 1. An O-ring seal 55 is provided between the plate and the wall. The insulator passes through a hole in the torus wall and encloses a short stainless steel tube 56 having a flange on its inner end. Tube 56 is fastened into a hole in the recess in the flange 6b of the liner by a nut 57, the recess in flange 6b being made wider than the corresponding recesses in flanges 6a, 6c, 6d and 6e for this purpose. A cap 58 is sealed to the outer end of insulator 53, this cap being watercooled by a pipe 61 and having welded to it a stainless steel tube 59 which projects within the insulator. A thin-walled stainless steel tube 60, which is a sliding fit on the ends of both tube 56 and tube 59, allows for expansion of the liner, shields the insulator from the discharge, and acts as a thermal impedance between the liner and the cap 58. The outer end of tube 59 is closed in a manner depending on its immediate function.

Two of the ports located in opposite quadrants are used to ionise the gas prior to each discharge. These two ports are similar to that already described, and through each passes a stainless steel rod 62 (FIG. 9) carrying a ring 63 of stainless steel tube which acts as an aerial. An R.F. discharge is passed between the two aerials in the manner described in the aforementioned specification.

Figure 6:
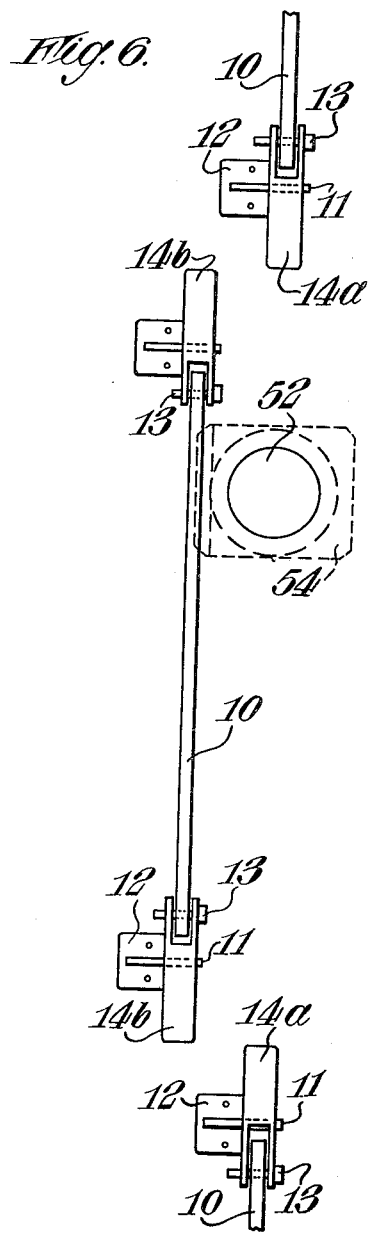
FIG. 6 is an enlarged view looking in the direction of arrow D in FIG. 1.

FIG. 6 illustrates how, in the region of each port 52, two of the outer blocks 14 are each divided to form two blocks 14a and 14b. The blocks 14b are mounted at lower level than the blocks 14a so that the block 10 mounted between them is clear of the port 52.

Figure 10:
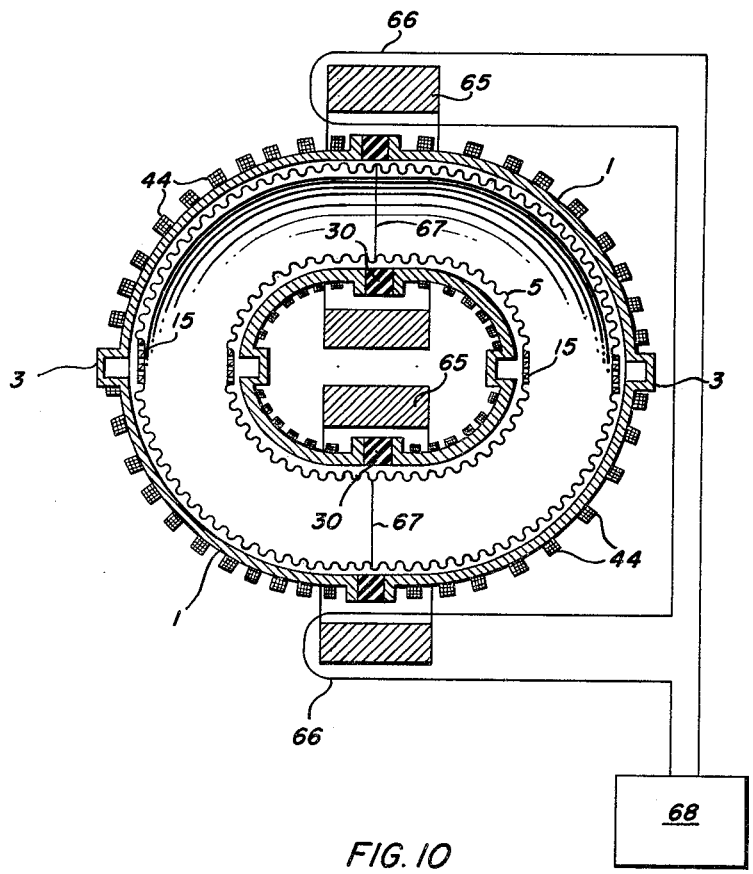
FIG. 10 is a schematic plan view, in cross-section, of the gas discharge apparatus.

In FIG. 10, the two half-sections of the torus 1 are shown separated by the two insulating rings 30. Also shown are the window boxes 3 for experimental observations and the formers 44 for the axial field windings. Within the torus is shown the corrugated liner 5 having a colander section 15 at each window box. The plug-and-socket joints between the two halves of the liner are indicated by the lines 67. Linking the torus 1 are two toroidal pulse transformer cores 65 carrying a primary winding 66 which is connected to a pulse voltage source 68 for inducing the ring discharge within the liner.

The liner is baked out by applying alternating current to winding 66, the liner acting as a secondary winding.

In the embodiment described, the resistance round the liner is about 0.02 ohm, which is about ten times the resistance of the discharge.

One advantage of using corrugated metal for the liner is that the effective length of the liner is increased and hence its electrical resistance. Also, the distribution of currents in the liner is more uniform than would be the case with a sheet metal liner, since the current paths round the inner and outer large circumference are the same length. Because of its flexibility, a corrugated liner is also easier to manufacture in the shape of a torus and to install.

I claim:

1. Gas discharge apparatus comprising a metal torus having a wall and at least one insulating gap around the circumference of the bore of the torus, means establishing a gaseous ring discharge within the torus and a liner located between the discharge and the wall of the torus, wherein said liner is continuously electrically conductive in the direction of the axis of the bore of the torus and wherein the material of said liner is corrugated, said corrugations serving to increase the effective length and electrical resistance in said direction such that the resistance is large compared with the predicted resistance of the discharge within the torus.

2. Apparatus as claimed in claim 1 wherein said material is stainless steel.

References Cited in the file of this patent

UNITED STATES PATENTS

| | | |
|---|---|---|
| 2,330,849 | Smith | Oct. 5, 1943 |
| 2,910,414 | Spitzer | Oct. 27, 1959 |

FOREIGN PATENTS

| | | |
|---|---|---|
| 1,016,376 | Germany | Sept. 26, 1957 |

OTHER REFERENCES

Atomics and Nuclear Energy, February 1958, pp. 58, 59.

Nuclear Power, February 1958, pp. 50–52.